United States Patent [19]

Cascino

[11] Patent Number: 5,328,937
[45] Date of Patent: Jul. 12, 1994

[54] FOAM BASED CORK SUBSTITUTE

[75] Inventor: Lawrence A. Cascino, South Bend, Ind.

[73] Assignee: Gaska Tape, Inc., South Bend, Ind.

[21] Appl. No.: 47,506

[22] Filed: Apr. 14, 1993

[51] Int. Cl.⁵ .............................................. C08J 9/30
[52] U.S. Cl. ........................................ 521/73; 521/91; 521/92; 521/97; 521/145
[58] Field of Search ............... 521/73, 91, 92, 97, 521/145

[56] References Cited

U.S. PATENT DOCUMENTS

| | | | |
|---|---|---|---|
| 3,066,110 | 12/1962 | Cornell | 521/73 |
| 3,224,894 | 12/1965 | Palmer | 521/73 |
| 3,261,784 | 7/1966 | Goecke et al. | 521/73 |
| 4,425,449 | 1/1984 | Dorsey | 521/73 |
| 4,477,599 | 10/1984 | Otsu | 521/73 |
| 4,485,192 | 11/1984 | Gibbs et al. | 521/73 |

*Primary Examiner*—Morton Foelak
*Attorney, Agent, or Firm*—R. S. Linne

[57] ABSTRACT

A foam spacer which is usable as a cork substitute in the base cushion layer of a glass spacer. The spacer, which is adapted to replace natural cork spacers is preferably laminated to a tack layer or otherwise adhered to a surface. The spacer is formed from a plasticized foamable resin which includes a quantity of incorporated reinforcing agents.

12 Claims, No Drawings

FOAM BASED CORK SUBSTITUTE

FIELD OF THE INVENTION

This invention relates to foams and will have application to a foam composition which can be used as a substitute for cork or the like.

BACKGROUND OF THE INVENTION

Object spacers are common useful items which are typically positioned between glass panes or others objects to protect the objects during shipment. Typical spacers utilized cork, neoprene or semi-rigid plastic layers which were adhered to the shipped object by surface adhesives or, as disclosed in U.S. Pat. No. 4,806,404, by a foam tack layer. The cork (polyethylene and other semi-rigid materials have also been used) provides support for the glass panels during shipment and also has recovery properties which provide for cushioning of the glass much like a shock absorber.

Phenolic resin-based products have previously been used as wood substitutes by adding fibrous materials to a phenolic resin mixture and then spraying or otherwise applying the reinforced material to a substrate. Such a process is disclosed in U.S. Pat. No. 4,595,710. Other reinforced plastics are disclosed in U.S. Pat. Nos. 4,749,625; 4,097,423; 4,097,422; 4,764,420; and 4,036,673. These prior reinforced foams all lacked the desired properties above-mentioned and are not usable as a replacement or substitute for natural cork.

SUMMARY OF THE INVENTION

The reinforced foam layer of this invention is formed from a plasticized polyvinyl chloride resin (PVC) and a suitable quantity of a reinforcing agent. The foam layer may be formed like any other PVC foam, namely, the plastisol is applied to a common release surface, heated to induce foam expansion, and cut into rolls for shipment.

By controlling the amount of fibers, resin and plasticizer, a foam is produced which substantially mimics the physical properties of natural cork at a fraction of the cost. The foam thus produced exhibits both a high compressive strength and has excellent recovery properties which make it highly useful as a glass spacer, among its many possible uses.

Accordingly, it is an object of this invention to provide for a novel and improved foam spacer.

Another object is to provide a foam spacer which possesses excellent compressive strength and recovery properties.

Another object is to provide a foam spacer which mimics the properties of cork, at a reduced price.

Other objects will become apparent upon a reading of the following description.

DESCRIPTION OF THE PREFERRED EMBODIMENT

The preferred embodiment herein described is not intended to be exhaustive or to limit the invention to the precise form disclosed. It is chosen and described to explain the principles of the invention, and its application and practical use to enable others skilled in the art to follow its teachings.

The reinforced foam of this invention is formed from three basic ingredients: a foamable resin; plasticizer; and a reinforcing agent. When cooled, the foam will mimic the physical properties of natural cork, and is particularly useful as the base cushion layer in a glass spacer, even though it has a number of other uses.

The foamable resin is preferably a PVC compound and may consist of a single resin or a mixture of resins. In a typical operation, equal parts of a blending resin and a dispersion resin are used to make the foam. Normally, between 50 and 60 parts by weight of a blending resin and 50–60 parts of a dispersion resin are employed.

The plasticizer component is preferably selected from the phthalate based compounds. Either a single phthalate compound may be employed or a blend of two or more phthalates may be utilized. In the preferred example, 30–40 parts by weight of a phthalate having a chain of 7–9 carbon atoms is used, along with 5–10 parts by weight of a phthalate having a chain of 10 or more carbon atoms.

The reinforcing agent employed is typically a quantity of a fibrous compound, and will preferably include a quantity of ceramic based fibers along with a small quantity of glass bubbles. In the preferred example, the reinforcing agent is added at between 35–50 parts by weight, with the bubbles accounting for 1–8 parts by weight of the total reinforcing agent composition.

Various additives may also be added to the mixture. Filler material such as calcium carbonate may also be added at 0–50 parts by weight. Among the additives which may be used are activator stabilizers, color and cell stabilizers, dispersing aid, coloring pigments and viscosity reducers. Blowing agent is preferably added to the mixture to assist in foaming. All of these additives are well-known in the art and will not be described in detail for purposes of clarity. If desired coloring agents may also be added to give the foam the physical appearance of cork as well.

The resin, plasticizer, reinforcing agent and additives are combined and mixed to form a plastisol mixture. The mixture is then cast on a release surface, either a casting belt, or preferably a release paper of conventional composition. The plastisol is heated in a conventional baking oven at between 360°–400° F. to chemically expand the plastisol emulsion into a foam layer. After cooling, the foam material is preferably wound into rolls and sold as a cork substitute. The following example is a typical production batch run of the foam of this invention.

EXAMPLE

The following materials were mixed together to form a substantially homogenous plastisol:

50 parts by weight of PVC blending resin;
50 parts by weight of PVC dispersion resin;
40 parts by weight of a 7–9 carbon chain phthalate;
10 parts by weight of diisodecyl phthalate;
35 parts by weight of ceramic fibers (5–30 microns long; 0.5–10 microns in diameter);
5 parts by weight of 3M Scotch-Lite TM glass bubbles;
9 parts by weight of BYK-Chemie BYK 40-13 viscosity reducer;
1.5 parts by weight of activator stabilizer;
2 parts by weight of cell stabilizer;
1.2 parts by weight of dry blowing agent;
1 part by weight of white pigment;
0.7 parts by weight yellow pigment;
0.1 parts by weight red pigment;
0.02 parts by weight black pigment;
2 parts by weight dispersing agent;

2 parts by weight color stabilizer; and
35 parts by weight calcium carbonate.

The plastisol was then cast on conventional silicone-coated release paper and baked at between 360°–400° F. for 3–4 minutes to chemically expand the plastisol into a foam. After the foam had cooled to room temperature, it was wound into rolls and sold as a cork substitute. The finished foam had a density of 25 lbs./ft. was light brown in color and was also possessed of high compressive strength and excellent recovery properties similar to those of natural cork.

The invention is understood to be not limited by the above-given details, but may be modified within the scope of the following claims.

What is claimed is:

1. A foam layer comprising:
   100–120 parts by weight of a foamable vinyl chloride resin;
   40–50 parts by weight of a phthalate plasticizer;
   35–50 parts by weight of ceramic fibers of a length between 5 microns–30 microns and a thickness of between 0.5 microns–10 microns; and
   a blowing agent wherein said foam layer is possessed of strength and recovery properties similar to those of natural cork.

2. The foam layer of claim 1 wherein said foamable resin is polyvinyl chloride, said plasticizer is a phthalate-based compound.

3. The foam layer of claim 2 wherein said phthalate-based compound includes 30–40 parts by weight of a 7–9 carbon chain phthalate, and 5–10 parts by weight of a phthalate having two or more branched chains of 10 or more carbon atoms each.

4. The foam layer of claim 2 wherein said reinforcing material further includes 1–8 parts by weight glass bubbles.

5. The foam layer of claim 2 and further including 0–50 parts by weight of a filler material.

6. The foam layer of claim 2 and further including a release liner, said foam layer cast onto said release liner.

7. The foam layer of claim 2 and further including 6–12 parts by weight of a viscosity reducing agent incorporated therein.

8. A method of making a foam layer which mimics the physical properties of cork comprising the steps of:
   a) providing a quantity of foamable vinyl chloride resin, phthalate plasticizer and reinforcing ceramic fibers of a length between 5 microns–30 microns and of a thickness between 0.5 microns–10 microns;
   b) mixing said foamable resin; phthalate plasticizer and ceramic fibers to form a plastisol;
   c) casting said plastisol onto a release surface, and
   d) heating said plastisol to expand the plastisol and form said foam layer.

9. The method of claim 8 wherein step a) includes providing 100–120 parts by weight of said resin, 40–50 parts by weight of a phthalate plasticizer at least 5–10 parts of which are a branched chain phthalate of ten or more carbon atoms each, and 35–50 parts by weight of said ceramic fibers.

10. The method of claim 9 wherein step c) includes casting said plastisol on a release paper.

11. The method of claim 9 wherein step a) includes providing 35–50 parts ceramic fibers, 1–8 parts by weight of glass bubbles step b) includes mixing said bubbles with said foamable resin, plasticizer and ceramic fibers.

12. The method of claim 11 wherein step b) further includes mixing coloring agents with said plastisol to give the foam layer an outward appearance which resembles natural cork.

* * * * *